US006253288B1

(12) United States Patent
McAllister et al.

(10) Patent No.: US 6,253,288 B1
(45) Date of Patent: Jun. 26, 2001

(54) HYBRID CACHE/SIRO BUFFER SYSTEM

(75) Inventors: David L. McAllister, Fort Collins; Michael R. Diehl, Loveland, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/070,190

(22) Filed: Apr. 30, 1998

(51) Int. Cl.$^7$ .................................................. G06F 12/00

(52) U.S. Cl. ........................ 711/137; 711/110; 712/207

(58) Field of Search ................................... 711/118, 133, 711/134, 137, 110, 146, 213; 712/207

(56) References Cited

U.S. PATENT DOCUMENTS

| | | | |
|---|---|---|---|
| 5,526,511 | * 6/1996 | Swenson et al. | 711/134 |
| 5,584,038 | * 12/1996 | Papworth et al. | 712/23 |
| 5,586,294 | * 12/1996 | Goodwin et al. | 711/137 |
| 5,918,045 | * 6/1999 | Nishii et al. | 711/213 |
| 5,983,321 | * 11/1999 | Tran et al. | 711/125 |

* cited by examiner

*Primary Examiner*—Matthew Kim
*Assistant Examiner*—Matt Anderson
(74) *Attorney, Agent, or Firm*—Kevin M. Hart (57) ABSTRACT

A hybrid cache/SIRO buffer system includes a latch array for storing data words corresponding to system addresses; read command generator circuitry for launching data read commands to a memory system; a write pointer; write circuitry for storing data arriving from the memory system into the latch array at the location indicated by the write pointer; lowest and highest pointers for indicating the locations in the latch array corresponding to a lowest and a highest system address for which a read command has been launched; read circuitry for retrieving data from the latch array randomly; and control circuitry. Responsive to a first read request by a host system, the system begins retrieving data from memory beginning with an address equal to or close to the address associated with the first read request; then it speculatively reads ahead. As read requests from the host system continue to be processed by the system, more speculative reads are executed until the buffer is nearly full of data. Once near-fullness occurs, low-address data in the buffer are overwritten with new data. In this manner, a traveling window to memory is provided. If the host system begins requesting data from an address region not covered by the window and such out-of-window requests result in a threshold number of buffer "misses," then the system reinitializes itself. Upon reinitialization, the system effectively opens a new memory window corresponding to the new range of addresses being requested by the host system.

19 Claims, 6 Drawing Sheets

HYBRID CACHE/SIRO BUFFER SYSTEM

FIELD OF THE INVENTION

This invention relates to methods and apparatus for improving memory read performance in computer systems, and relates particularly to cache systems, FIFO buffers and the like.

BACKGROUND

Memory read efficiency is an important benchmark for measuring the performance of most computer systems and their memory intensive subsystems. Because high speed memory systems are typically more expensive to implement than low speed memory systems, most designers utilize a hierarchy of memory speeds in order to achieve a balance between price and performance. For example, large volume storage needs may be met using a low cost, low speed device such as a magnetic or optical disk. Intermediate volume storage needs may be met using static or dynamic random access memory ("RAM"), which has an intermediate cost and response time. A cache memory may be used to enhance system performance by providing very small volume storage capacity but with very fast response time. Unfortunately, cache memory is the most expensive type to implement because of the high cost of high speed RAM and the relatively large overhead associated with cache system control circuitry and algorithms.

Another type of memory arrangement typically found in computer systems is the well known first-in-first-out ("FIFO") buffer. A FIFO buffer is useful, for example, in providing a data path between subsystems having different or varying data transfer speeds. While a FIFO buffer is relatively inexpensive to implement, its applications are limited by its simplicity.

In some contexts, none of the above memory systems can yield satisfactory performance at a satisfactory price. One such context is found in graphics subsystems wherein reads of data by a host processor from a frame buffer or other memory are common. Typically, such data reads in the aggregate are intended to retrieve data that are stored in a contiguous block of addresses. Frequently, however, the read commands are not issued by the host processor in perfect address order. Instead, they are merely "weakly" ordered. If the data reads were issued in perfect address order, then performance enhancement could be achieved inexpensively in such a context by fetching ahead and placing speculatively read data in a FIFO buffer. But if the read commands are not issued in perfect address order, such a solution would not perform well because the FIFO buffer would have to be flushed each time a break occurred in the sequence of addresses requested by the read commands. While a traditional cache memory could be used to achieve a performance enhancement in the case of weakly-ordered reads, the expense and overhead of a traditional cache memory solution could not easily be justified for solving such a special-case problem in such a special-purpose computer subsystem.

Therefore, a need exists for a relatively inexpensive memory arrangement that will yield a performance improvement in cases wherein read commands are issued to retrieve data that are stored at contiguous addresses, but wherein the read commands are not issued in perfect address order.

SUMMARY OF THE INVENTION

The invention includes numerous aspects, each of which contributes to improving read performance when read commands are issued by a host system intending to retrieve data that are stored at contiguous addresses in memory, but when the host system does not issue the read commands in perfect address order.

In one aspect, the invention includes a hybrid cache/SIRO buffer system. Responsive to a first read request by a host system, the cache/SIRO buffer begins to retrieve data from memory. It first retrieves data from an address that is equal to or close to the address associated with the first read request; but then it also retrieves data from subsequent addresses, regardless of whether the subsequent addresses were actually requested by the host system. In other words, the cache/SIRO buffer speculatively reads ahead. Data that have been stored in the cache/SIRO buffer system are available to be accessed randomly. As read requests from the host system continue to be processed by the cache/SIRO buffer system, more speculative reads are executed by the cache/SIRO buffer system until the buffer is nearly full of data. Once near-fullness occurs, low-address data in the buffer are overwritten with new data.

Thus, the cache/SIRO buffer system effectively opens a memory window beginning with an address equal to or near the first address requested by the host system, and then moves the memory window forward as further read requests from the host system are processed. In this manner, a traveling window to memory is provided. If the host system begins requesting data from an address region not covered by the window and the out-of-window requests result in a threshold number of buffer "misses," then the buffer reinitializes itself. Upon reinitialization, the cache/SIRO buffer system effectively opens a new memory window corresponding to the new range of addresses being requested by the host system.

BRIEF DESCRIPTION OF THE DRAWINGS

FIGS. 4A–F illustrates the latch array and pointers of the hybrid cache/SIRO unit of FIG. 2 after initialization under a second set of conditions and at various times during their subsequent operation.

FIGS. 7A–B is a flow diagram illustrating a preferred sequence of steps to be performed during the "operate" state of FIG. 5.

DETAILED DESCRIPTION OF THE PREFERRED EMBODIMENTS

The preferred embodiments of the invention will now be described in detail, first with reference to structure and then with reference to functionality.

Structure

Figure 1:
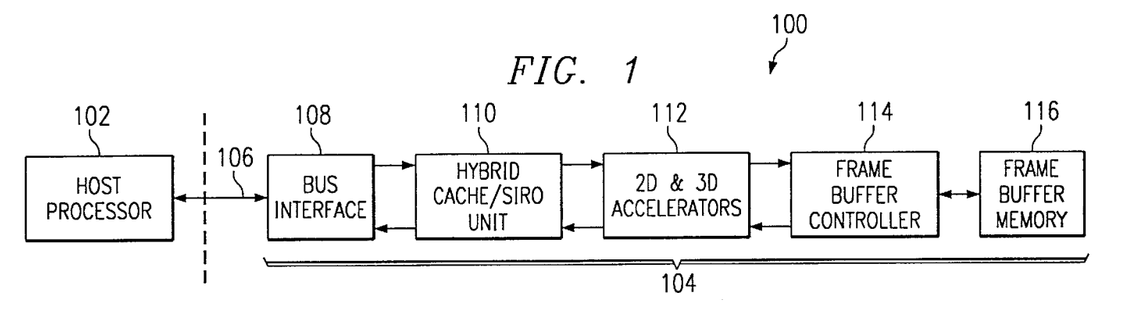
FIG. 1 is a block diagram illustrating a computer system in which a host processor is coupled to a graphics pipeline that includes a hybrid cache/SIRO unit according to a preferred embodiment of the invention.

FIG. 1 illustrates a portion of a computer system 100 having a preferred embodiment of the invention implemented therein. While the drawing indicates how the invention might be employed in a particular context (i.e., in a computer graphics pipeline), the drawing is not intended to limit application of the invention to the context illustrated. Rather, the invention may be applied in a variety contexts as was suggested above; but the graphics pipeline application illustrated and discussed herein will facilitate exposition of the invention's preferred construction, operation and features. It will be appreciated by those skilled in the art that data word widths, address lengths, register sizes and the like discussed herein are implementation-specific and are intended to be illustrative only. They are not intended to limit the scope or application or the invention.

Host processor 102 is coupled to a graphics pipeline 104 via bus 106. Bus 106 may be any type of data transfer or I/O bus, but will typically be a PCI or AGP bus if computer system 100 is a personal computer system based on one or more INTEL-type microprocessors. Bus interface 108 may be conventional and is intended to represent any circuitry for interfacing graphics pipeline 104 with bus 106. Hybrid cache/SIRO unit 110 is disposed between bus interface 108 and the rest of graphics pipeline 104, namely 2D and 3D accelerators 112, frame buffer controller 114 and frame buffer memory 116. "SIRO" is an acronym for serial-in-random-out. Although the acronym SIRO has been used in the prior art to describe the functionality of certain kinds of buffer arrangements, it will be appreciated from the discussion and drawings contained herein that hybrid cache/SIRO unit 110 does not behave in the same manner as any SIRO buffer or cache system of the prior art.

In the context of the application shown in the drawings, host processor 102 issues read (and write) requests to graphics pipeline 104 intending to access locations, for example, in frame buffer memory 116. Of particular interest in the following discussion are read requests: Once a read request is received by hybrid cache/SIRO unit 110 via bus interface 108, a corresponding read command must constructively be "launched down the pipeline" of components that includes 2D and 3D accelerators 112, frame buffer controller 114 and frame buffer memory 116 in order to access the appropriate data. There will be some delay before data responsive to the read command filters back up the pipeline to hybrid cache/SIRO unit 110. Therefore, in the following discussion, reference will be made to "launching" read commands down the pipeline and "receiving data from the pipeline" responsive to previously-issued read commands. These terms will simply refer to the propagation and processing of read commands down and back through 2D and 3D accelerators 112, frame buffer controller 114 and frame buffer memory 116.

Figure 2:
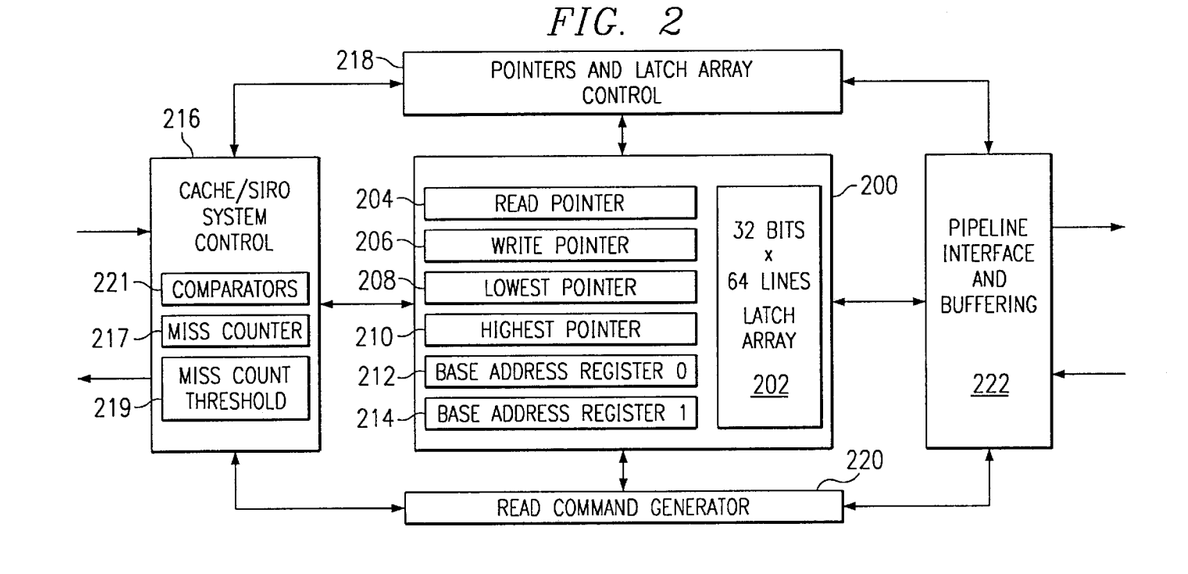
FIG. 2 is a block diagram illustrating the hybrid cache/SIRO unit of FIG. 1 in further detail.

FIG. 2 illustrates a preferred implementation of hybrid cache/SIRO unit 110. Pointers and latch array block 200 contains 32-bit×64-line latch array 202, as well as 6-bit read pointer 204, 7-bit write pointer 206, 6-bit lowest pointer 208, 7-bit highest pointer 210, 16-bit base address register 0 (shown at 212), and 16-bit base address register 1 (shown at 214). Although only six bits are required to uniquely address the 64 lines of latches in latch array 202, write pointer 206 and highest pointer 210 are provided with a seventh bit. These seventh bits are overflow bits used to indicate when the respective pointers have "wrapped" from address 63 to address 0 of latch array 202. They are also used as MSBs during comparisons, as will be discussed in further detail below.

Read command generator 220 may be implemented as a state machine. Its job is to generate read commands appropriate for accessing desired memory locations in the graphics pipeline downstream of hybrid cache/SIRO unit 110 either one at a time or in groups, as will be discussed in further detail in the context of FIGS. 6 and 7. Pointers and latch array control block 218 may also be implemented as a state machine and is responsible for manipulating the various data paths, clocks and enable signals within pointers and latch array block 200 as necessary to set and increment the pointers and base registers, load data into the latch array at the write pointer location, and dump data from the read pointer location to cache/SIRO system control block 216 for communication back to bus 106. Pipeline interface and buffering block 222 represents the control, data path and buffering circuitry necessary for routing read commands to 2D and 3D accelerators 112 as well as for receiving data from 2D and 3D accelerators 112 responsive to the read commands. Details of the implementation of pipeline interface and buffering block 222 will depend a great deal on the specifics of the host system in which hybrid cache/SIRO unit 110 is embedded and are not particularly pertinent to the construction or functionality of the invention; therefore, they will not be discussed in further detail herein.

Cache/SIRO system control block 216 represents the circuitry for controlling the overall behavior of hybrid cache/SIRO unit 110. In addition to keeping track of the state of data in the pipeline downstream of hybrid cache/SIRO unit 110 and responding to bus cycles appropriately upstream of hybrid cache/SIRO unit 110, cache/SIRO system control block 216 generally implements the behavior indicated in the state diagram of FIG. 5. For purposes of this discussion, it is assumed that block 216 will also contain miss counter 217 for counting cache/SIRO misses, miss threshold register 219 against which the value in miss counter 217 will be compared, and also comparators 221 necessary for performing the pointer-versus-address comparisons that are discussed in further detail below. Persons having ordinary skill in the art and having reference to this document (particularly the functional description provided below accompanying FIGS. 3, 4A–F and 5–7) will be able to create suitable control circuitry for implementing the just-described blocks 216, 218, 220 and 222 without undue experimentation. In addition, it should be noted that the required control circuitry need not necessarily be cast into the four blocks specifically described herein, but may be divided differently according to the convenience of the designer and the constraints of the host environment.

Functionality

Figure 3:
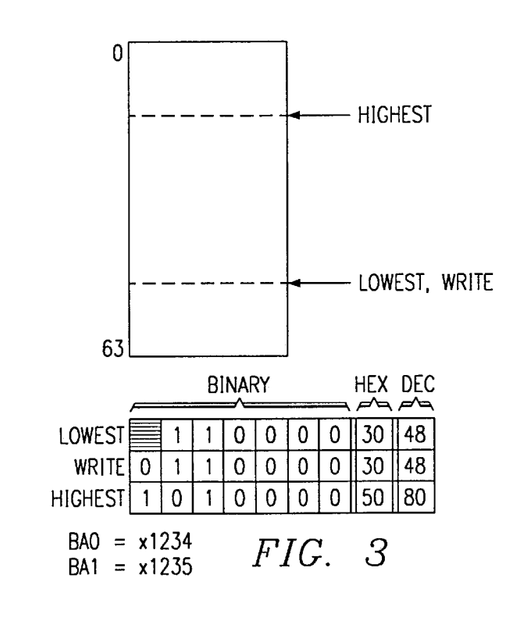
FIG. 3 illustrates the latch array and pointers of the hybrid cache/SIRO unit of FIG. 2 after initialization under a first set of conditions.
Figure 4A:
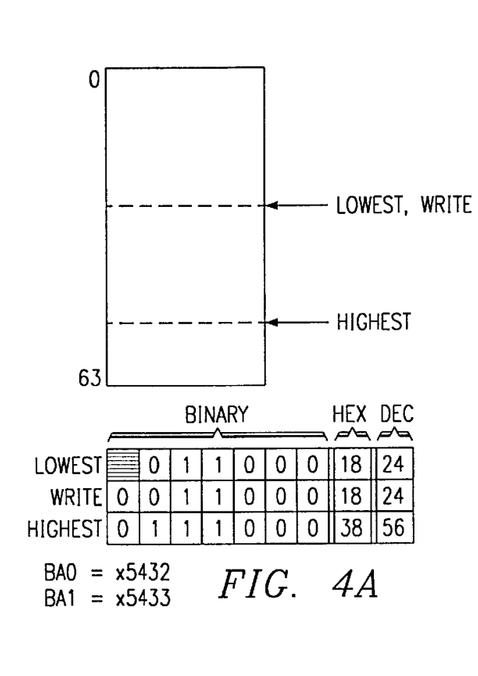
Figure 5:
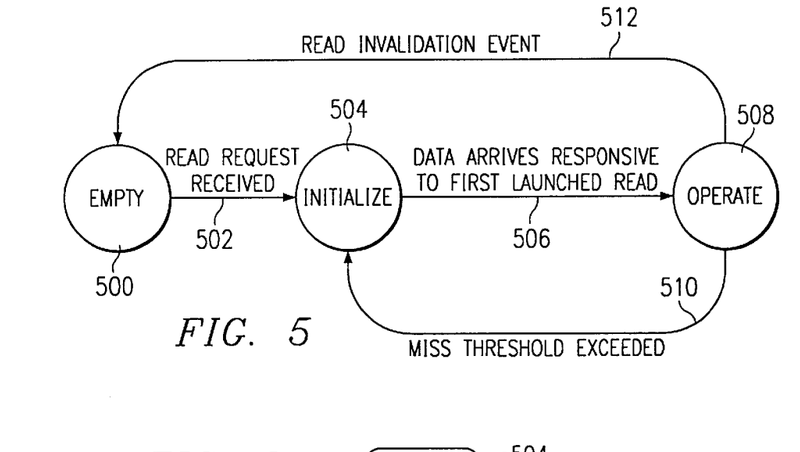
FIG. 5 is a state diagram illustrating a preferred general sequence of operative states for the hybrid cache/SIRO unit of FIG. 2.

The functionality of hybrid cache/SIRO unit 110 will now be discussed with reference to FIGS. 3, 4A–F and 5–7. Assume hybrid cache/SIRO unit 110 is in empty state 500 (FIG. 5). Then, assume host processor 102 issues a read request. (In the embodiment described herein, a read request from the host processor 102 would be associated with a 32-bit address. However, the most significant 8 bits of this address field are used for mapping the graphics subsystem within the memory space and are masked off at bus interface 108. Therefore, from the perspective of hybrid cache/SIRO unit 110, each read request will be associated with a 24-bit address ADR[23:0]). As indicated by path 502, hybrid cache/SIRO unit 110 will then transition to state 504, where it will initialize itself.

Initialize State

Figure 6:
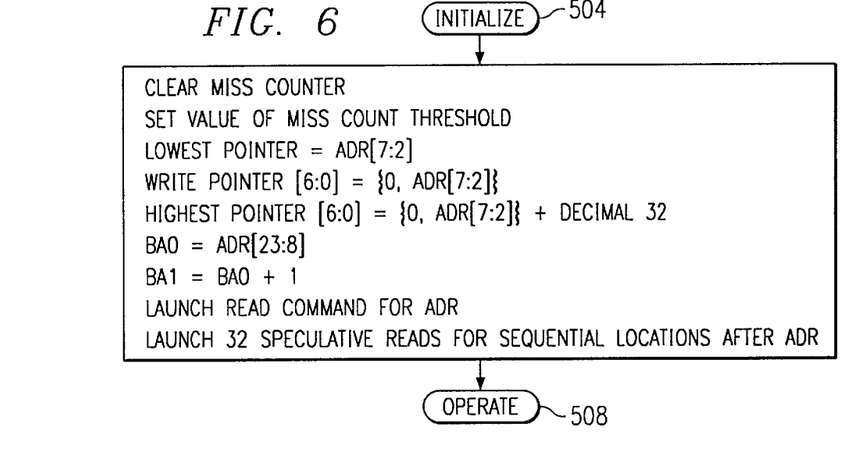
FIG. 6 is a flow diagram illustrating a preferred sequence of steps to be performed during the "initialize" state of FIG. 5.
Figure 7A:
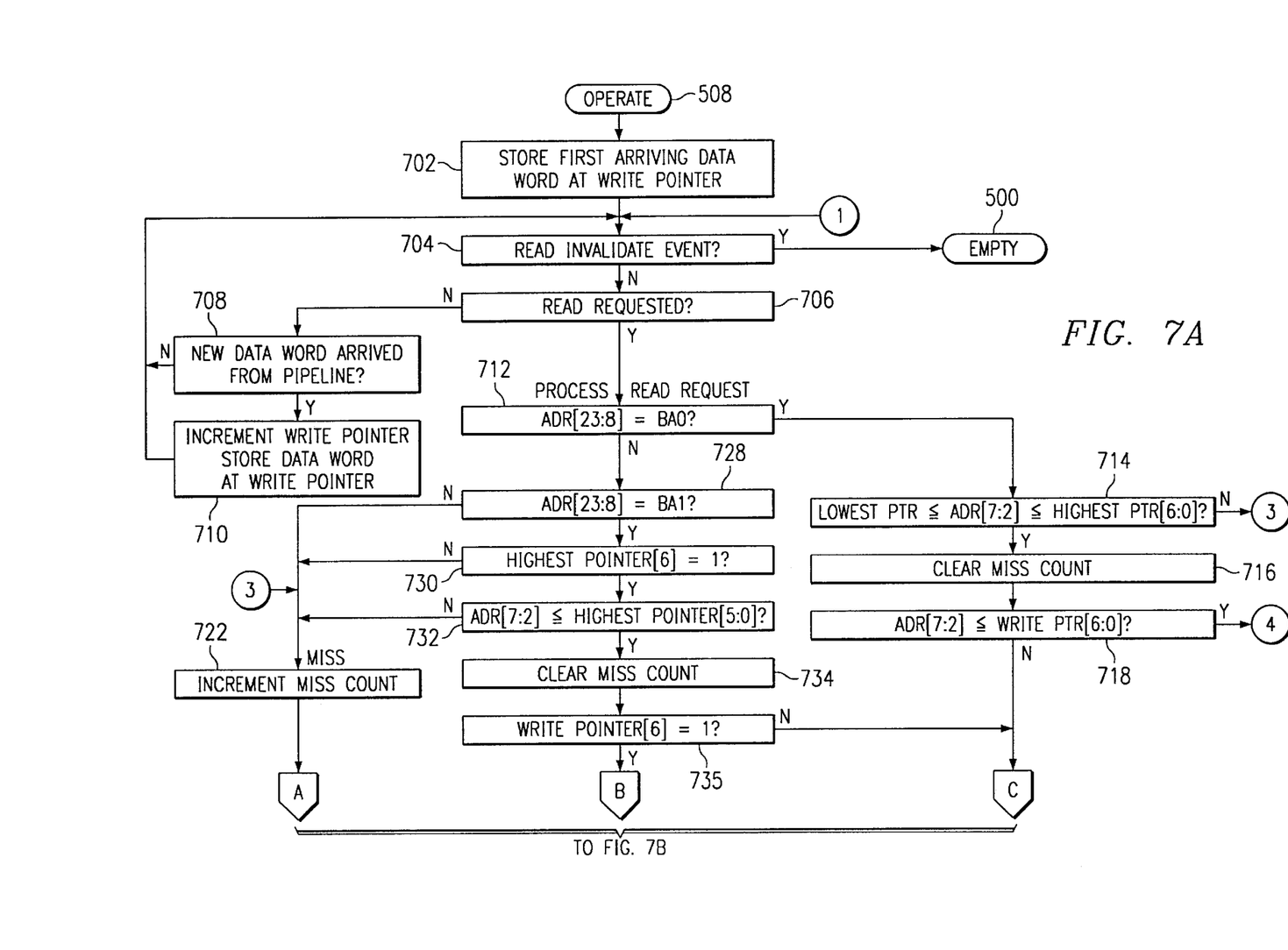
Figure 7B:
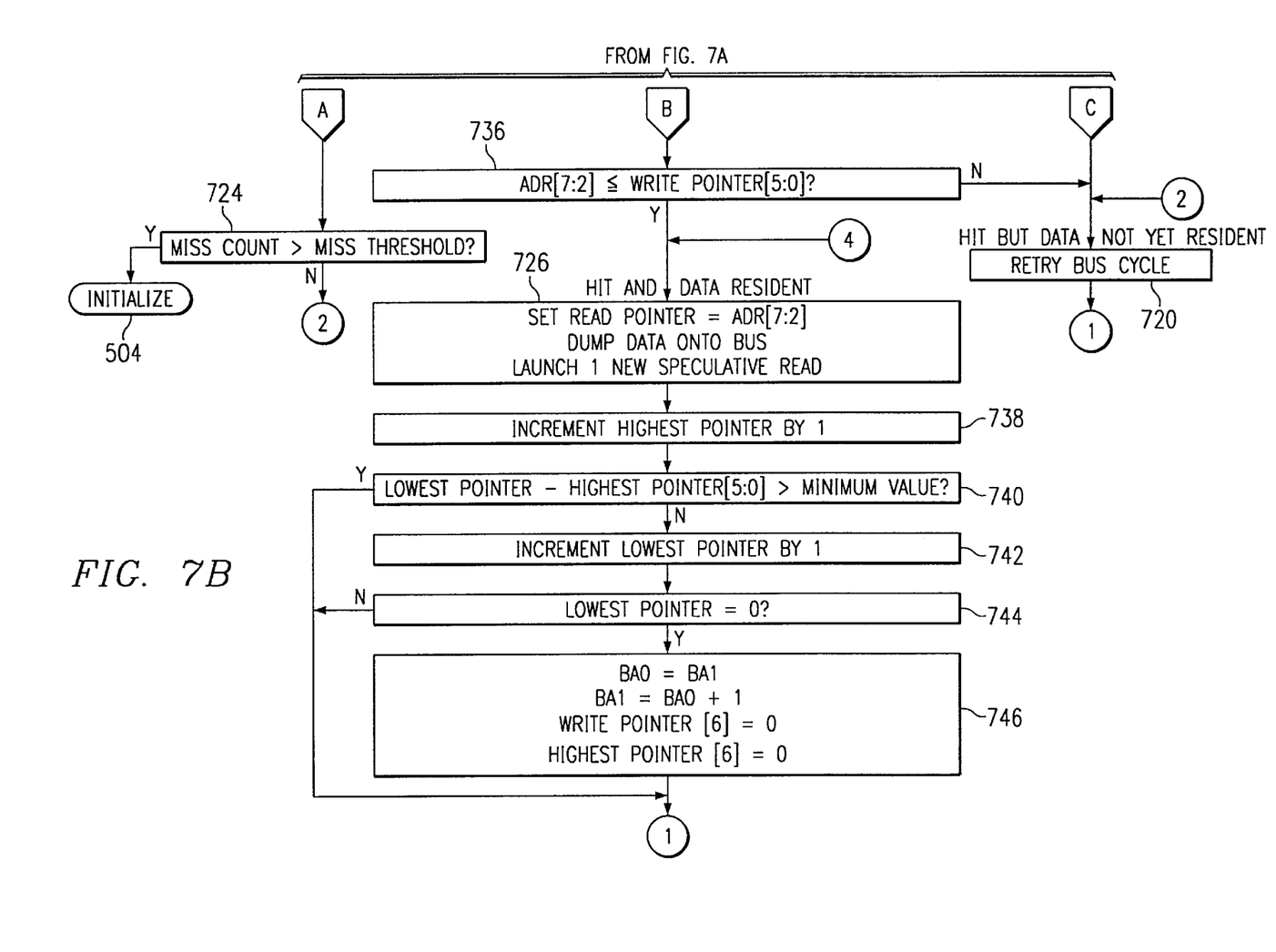

Referring to the flow diagram of FIG. 6, miss counter 217 is cleared, and miss count threshold register 219 is set to a suitable value such as ten or fifteen. (The miss count threshold value represents the number of times the machine will issue consecutive bus retries when consecutive read requests result in misses on hybrid cache/SIRO unit 110. As will be discussed in more detail below, once this miss threshold is exceeded, hybrid cache/FIFO unit 110 will reinitialize itself. In an alternative embodiment, miss counter 217 may be initialized to the threshold value, decremented when misses occur, and reset to the threshold value when hits occur.) Next, lowest counter 208 and write pointer 206 are both set equal to a value derived from part of ADR[23:0]. Namely, in the example embodiment shown, they are set equal to ADR[7:2]. (In the case of write pointer 206, the MSB is initialized to zero; only bits 5:0 are set equal to ADR[7:2].) The two LSBs of ADR are not included in this initialization because, in computer system 100, addresses are always forced to a four-byte boundary; therefore the two LSBs are always zero. Also, each line of latch array 202 is four bytes wide. After all bits of highest pointer 210 have been cleared, the result of adding decimal 32 to ADR[7:2] is stored in highest pointer 210. If the result of the addition is equal to or less than decimal 63, the MSB of highest pointer 210 (the overflow bit) will initialize to zero; but if the result is equal to or greater than decimal 64, then the MSB of highest pointer 210 will initialize to one. Finally, read command generator 220 launches one read command down the pipeline to retrieve the data at ADR (the "actual" read command), and then speculatively launches further read commands for the 32 addresses subsequent to ADR (the "speculative" read commands). This is done on the theory that future read requests from host processor 102 will be directed to locations subsequent to but close to ADR. Each of the actual and speculative read commands corresponds to a 32-bit data word. As the actually and speculatively requested 32-bit data words begin arriving sequentially from the pipeline, the machine will transition to another state that will be further described below. For the moment, suffice it to say that the first received word will be stored in the line of the latch array indicated by write pointer 206. Then write pointer 206 will be incremented by one, and the next received word will be stored at the new write pointer location, and so on sequentially. The result will be that each arriving word will be stored in the line of the latch array whose line number corresponds to bits 7:2 of the data word's address.

Purpose of Lowest and Highest Pointers

Recall from the above discussion that there is a latency between the time when hybrid cache/SIRO unit 110 launches a read command down the pipeline and the time when it receives data from the pipeline responsive to the command. Recall also that read command generator 220 reads ahead speculatively in the hopes of already having data stored in latch array 202 by the time host processor 102 requests it. It is therefore helpful for hybrid cache/SIRO unit 110 to keep track not only of which data words are currently resident in latch array 202, but also to keep track of the data words that have been requested and are soon to arrive. For this purpose, locations are reserved within latch array 202 for all data words that have been requested, regardless of whether they have arrived from the pipeline. In this manner, if host processor 102 requests data corresponding to one of the "reserved" locations, then hybrid cache/SIRO unit 110 will know the result is not really a cache/SIRO "miss," but rather a "hit but data not yet resident." Lowest pointer 208 indicates the data line in latch array 202 corresponding to the lowest system address for which a read has been launched down the pipeline. At any given moment, the data destined for that line may or may not yet be resident in the latch array. Highest pointer 210 indicates the data line in latch array 202 corresponding to the highest system address for which a read has been launched down the pipeline. At any given moment, the data destined for that line may or may not yet be resident in the latch array.

Initialization Example 1

By way of example, suppose hybrid cache/SIRO unit 110 was in empty state 500, and then host processor 102 requested a read of address x1234C0. After hybrid cache/SIRO unit 110 transitioned to state 504 and initialized, the result would be as shown in FIG. 3. Base address register 0 ("BA0") is set equal to ADR[23:8], which corresponds to x1234. Base address register 1 ("BA1") is set equal to BA0 plus 1, or x1235. The lowest pointer and the write pointer are both set equal to ADR[7:2], which corresponds to decimal 48. The highest pointer is set equal to the value of the lowest pointer plus decimal 32 to take into account that there will be 32 speculative reads launched during initialization. Because the result of this addition yields a number higher than 63, the overflow bit of the highest pointer (bit 6) will be set to one. Taking the overflow bit into account as the MSB, the highest pointer initialization value is decimal 80. Note, however, that only bits 5:0 of any of the pointers are used to address lines in the latch array. Therefore, the initialization value of the highest pointer corresponds to line number 16 in the latch array, as indicated by the arrow.

Initialization Example 2

As a second example, suppose hybrid cache/SIRO unit 110 was in empty state 500, and then host processor 102 requested a read of address x543260. After hybrid cache/SIRO unit 110 transitioned to state 504 and initialized, the result would be as shown in FIG. 4A. Base address register 0 ("BA0") is set equal to ADR[23:8], which corresponds to x5432. Base address register 1 ("BA1") is set equal to BA0 plus 1, or x5433. The lowest pointer and the write pointer are both set equal to ADR[7:2], which corresponds to decimal 24. The highest pointer is set equal to the value of the lowest pointer plus decimal 32 to take into account that there will be 32 speculative reads launched during initialization. The result for the highest pointer is an initialization value of decimal 56.

Operate State

Once initialized, hybrid cache/SIRO unit 110 waits until the data word corresponding to the first of the launched read commands returns from the pipeline. Once this occurs, the machine transitions to operate state 508, as indicated by path 506. In operate state 508, the machine behaves generally according to the flow diagram of FIG. 7. Beginning with step 702, the machine stores the first data word arriving from the pipeline into latch array 202 at the location pointed to by write pointer 206. At step 704, the machine checks to see if a read invalidation event has occurred. Examples of read invalidation events would be if a reset of computer system 100 has occurred or if host processor 102 issues a write to a location in frame buffer memory 116. Both of these kinds of events would cause any data in latch array 202 potentially to become stale. Therefore, if a read invalidation event is detected in step 704, the machine transitions to empty state 500 (as indicated in FIG. 7 and also at path 512 of FIG. 5). Note: In the example embodiment described herein, hybrid cache/SIRO unit 110 was designed to delay the processing of any write commands down the pipeline until at least one read request from host processor 102 had been responded to by delivering the requested data to bus interface 108 or until the miss threshold had been exceeded. This was done in order to avoid having the machine fall into an endless loop (i.e., to avoid "thrashing"). If this anti-thrashing safeguard is implemented, then it is possible to place step 704 where it is shown in the flow diagram. If this safeguard is not implemented, then more elaborate means will have to be employed to avoid thrashing.

Assuming a read invalidation event was not detected in step 704, the machine checks in step 706 to see if a read has been requested by host processor 102. If not, the machine checks in step 708 to see if a new data word has arrived from the pipeline responsive to a previously launched read command. If so, write pointer 206 is incremented by one in step 710 and the new data word is stored in latch array 202 at the new location pointed to by write pointer 206. Then, operation resumes at step 704. If no new data is detected in step 708, operation also resumes at step 704. Steps 708 and 710 are included in FIG. 7 primarily for the sake of completeness and convenience. In an actual embodiment, the mechanism for responding to the arrival of new data words from the pipeline may be implemented as an independent state machine.

"Process Read Request" Routine: If the machine detects in step 706 that a read has been requested, then the read request is processed beginning at step 712 as follows. Recall that each read request is accompanied by a 24-bit read address ADR[23:0]. In step 712, ADR[23:8] are compared with the value stored in BA0. If they are equal, then operation continues with step 714. In step 714, ADR[7:2] is compared with the value of lowest pointer 208 and the value of highest pointer 210. During the latter comparison, the overflow bit of highest pointer 210 is counted as its MSB. If ADR[7:2] is greater than or equal to lowest pointer 208 and less than or equal to highest pointer 210 including its MSB, then the machine is assured that the target data either is in latch array 202 already or will soon be there. If so, therefore, the miss counter is cleared in step 716, and operation continues with step 718. If not, then operation continues at step 722 with the "Miss" routine discussed below.

Assuming operation continued through step 716, ADR [7:2] is next compared in step 718 with the value of write pointer 206 (counting the overflow bit of write pointer 206 as its MSB). If ADR[7:2] is greater than write pointer 206 including its MSB, then operation continues at step 720 with the "Hit But Data Not Yet Resident" routine discussed below. If, on the other hand, it is determined during step 718 that ADR[7:2] is less than or equal to write pointer 206 including its MSB, then the data is resident in latch array 202. In that case, operation continues at step 726 with the "Hit And Data Resident" routine discussed below.

Assume now that, during step 712, it was determined that ADR[23:0] was not equal to BA0. If so, then operation would have continued with step 728. In step 728, ADR[23:8] is compared with the contents of BA1. If they are not equal, then the result is a miss, and operation continues at step 722 with the "Miss" routine discussed below. But if ADR[23:8] is equal to BA1, then operation continues with step 730. In step 730, the overflow bit of highest pointer 210 is checked. If it is not equal to one, then the result is a miss and operation continues with the "Miss" routine at step 722. But if it is equal to one, then ADR[7:2] is compared with highest pointer 210 in step 732 (this time not counting the overflow bit of highest pointer 210 as the MSB). If ADR[7:2] is greater than highest pointer 210 (not including bit 6), then the result is once again a miss, and operation continues with the "Miss" routine at step 722. But if ADR[7:2] is less than or equal to highest pointer 210 (not including bit 6), then the miss counter is cleared in step 734, and operation continues at step 735.

In step 735, the overflow bit of write pointer 206 is checked. If it is not equal to one, then it is not possible for the requested data to be resident in latch array 202; therefore, in that case, operation continues at step 720 with the "Hit But Data Not Yet Resident" routine. On the other hand, if the write pointer overflow bit is equal to one, then it is possible that the requested data could be resident in latch array 202; therefore, in that case, operation continues with step 736. In step 736, ADR[7:2] is compared with write pointer 206 (this time not counting the overflow bit of write pointer 206 as its MSB). If ADR[7:2] is greater than write pointer 206 (not including bit 6), then operation continues at step 720 with the "Hit But Data Not Yet Resident" routine discussed below. But if ADR[7:2] is less than or equal to write pointer 206 (not including bit 6), then operation continues at step 726 with the "Hit And Data Resident" routine discussed below.

"Miss" Routine: The miss routine begins at step 722. In step 722, miss counter 217 is incremented. In step 724, the value of the incremented miss counter is compared to the value stored in miss count threshold register 219. If the miss count is greater than the threshold, then the machine will transition to initialize state 504 (as indicated in FIG. 7 and also indicated by path 510 in FIG. 5), where it will reinitialize to the last requested read address. If the miss count is not yet greater than the threshold, then the machine issues a bus retry in response to the read request and continues operation at step 704.

"Hit But Data Not Yet Resident" Routine: The hit but data not yet resident routine consists of step 720, wherein a bus retry is issued in response to the read request. Then, operation continues at step 704.

"Hit And Data Resident" Routine: The hit and data resident routine begins at step 726. In step 726, read pointer 204 is set equal to ADR[7:2]. Then, the data stored in latch array 202 at the location indicated by read pointer 204 is routed to bus interface 108 in response to the read request. Next, hybrid cache/SIRO 110 launches one new speculative read down the pipeline. The address used for this new speculative read will be the next sequential address after the one corresponding to highest pointer 210. In step 738, highest pointer 210 is incremented by one to account for the fact that this new speculative read has been launched. In step 740, the six LSBs of highest pointer 210 are compared with the value of lowest pointer 208. If the quantity (highest pointer bits [5:0] minus the value in lowest pointer) is less than a minimum value, say four, then this means highest pointer 210 is close to passing lowest pointer 208, which is not allowed. If this is the case, then operation continues at step 742; otherwise, the routine is complete and operation continues at step 704. In step 742, lowest pointer 208 is incremented by one so that it can stay ahead of highest pointer 210. The purpose of step 744 is to determine whether incrementing lowest pointer 208 by one caused it to wrap from address 63 to address 0 of latch array 202. If the value of lowest pointer 208 is determined in step 744 to be equal to zero, then this indicates that the pointer has just wrapped. If so, operation continues at step 746; otherwise, the routine is complete and operation continues at step 704. In step 746, the value of BA0 is set equal to the value of BA1. Then, the value of BA1 is incremented by one. The overflow bits of write pointer 206 and highest pointer 210 are cleared, and then operation resumes at step 704.

Further Examples

The results of the above-described functionality will be better understood by working through more example cases.

Figure 4B:
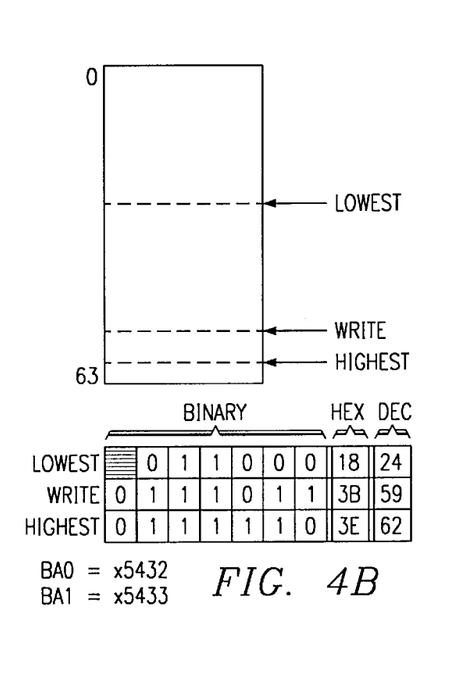

FIG. 4B: Suppose hybrid cache/SIRO unit 110 has been initialized according to initialization example 2 discussed above in the context of FIG. 4A. Also assume the following: (1) The data word corresponding to the first launched read command has been received from the pipeline and stored in the latch array. (2) The data words corresponding to the initial 32 speculative read commands have been received from the pipeline and stored in the latch array. (3) Six read requests have resulted in "Hit And Data Resident." (Recall that one speculative read will have been launched for each of these hits.) And (4) three of the data words corresponding to the last six speculative reads have been received and stored in the latch array. The result will be as shown in FIG. 4B. The write pointer will have incremented to decimal 59, and the highest pointer will have incremented to decimal 62. The lowest pointer remains where it was after initialization.

Figure 4C:
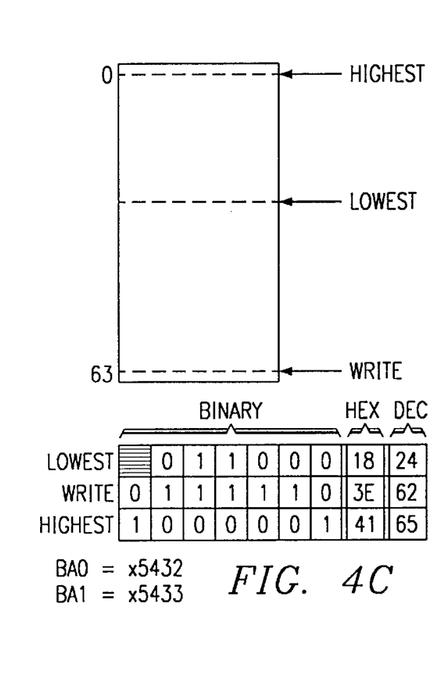

FIG. 4C: Next suppose three more read requests result in "Hit And Data Resident." This will cause three more speculative reads to be launched and the highest pointer to be incremented three more times. The result is illustrated in FIG. 4C. Including the MSB, the highest pointer now contains decimal 65; but the six LSBs have wrapped to address 1 of the latch array, as indicated by the arrow. The write pointer in FIG. 4C indicates that three more data words responsive to speculative reads have been received from the pipeline and stored in the latch array. The lowest pointer remains where it was after initialization.

Figure 4D:
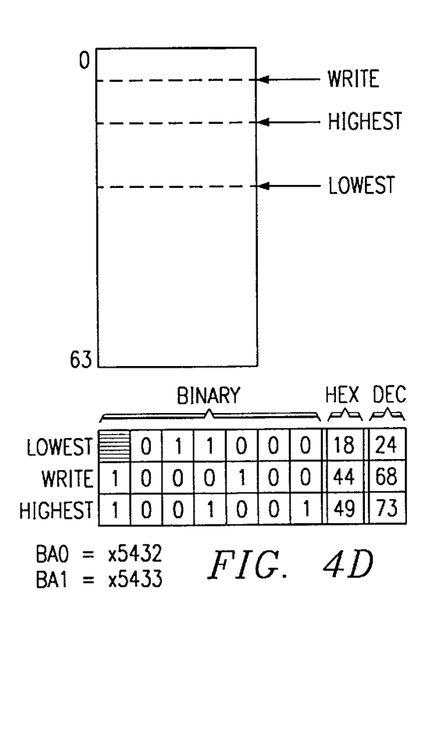

FIG. 4D: FIG. 4D illustrates the situation after eight more read requests have resulted in "Hit And Data Resident," and after six more data words corresponding to speculative reads have been received and stored. Note that the write pointer has now also wrapped; its MSB is equal to one. As was explained above, only the six LSBs are used to address locations in the latch array, thus the position of the write pointer arrow. The lowest pointer still has not moved.

Figure 4E:
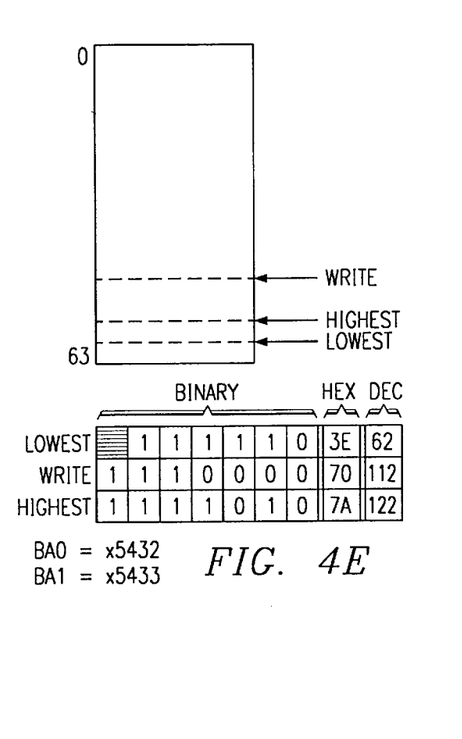

FIG. 4E: In FIG. 4E, forty-nine more read requests have resulted in "Hit And Data Resident," and forty-four more data words responsive to speculative reads have been received and stored. Note that the lowest pointer has advanced. This indicates that steps 740–746 (see FIG. 7) were triggered by virtue of the fact that the highest pointer was about to pass the lowest pointer. When this happens, the lowest pointer is always advanced to stay ahead of the highest pointer; thus, the window of valid data stored in the latch array starts moving forward.

Figure 4F:
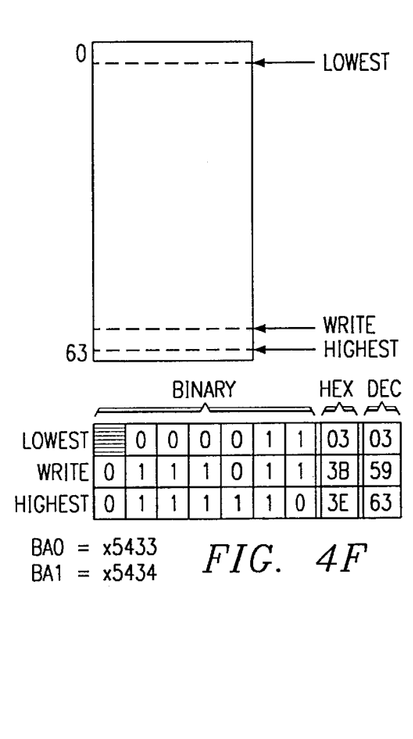

FIG. 4F: Finally, FIG. 4F is included to illustrate what happens after the lowest pointer wraps from address 63 to address 0 of the latch array. During the time elapsed between FIG. 4E and FIG. 4F, assume that five additional read requests have resulted in "Hit And Data Resident," and that eleven additional data words responsive to speculative reads have been received and stored. This would normally mean that the highest pointer would have advanced to decimal 127 and the write pointer would have advanced to decimal 123. But when the read requests were being processed, the tail pointer was advancing to stay a minimum of four lines ahead of the highest pointer. It eventually wrapped from address 63 to address 0 of the latch array. Just after the tail pointer wrapped from address 63 to address 0 of the latch array, BA0 and BA1 were both incremented, and the MSBs of the write pointer and the highest pointer were set to zero. Therefore the write pointer now contains decimal 59 rather than decimal 127, and the highest pointer now contains decimal 63 rather than decimal 127. Because of the adjustment of BA0 and BA1, however, all pointers are still valid and operation may continue in this manner indefinitely.

Further Embodiments

While the invention has been described in detail in relation to a preferred embodiment thereof, the described embodiment has been presented by way of example and not by way of limitation. It will be understood by those skilled in the art that various changes may be made in the form and details of the described embodiment resulting in equivalent embodiments that will remain within the scope of the appended claims.

For example, in other implementations, latch array 202 may have different dimensions, and may also be constructed using a RAM. If the dimensions of latch array 202 were changed, it will be appreciated that the sizes of the various pointers within pointers and latch array block 200 would have to be changed accordingly.

In yet further embodiments, the initialization routine may be modified so that more LSBs of ADR[23:0] are truncated when lowest pointer 208 and write pointer 206 are initialized. (For example, lowest pointer 208 and write pointer 206 may be initialized to ADR[7:4] instead of ADR[7:2].) In this manner, the first data word stored in the latch array will usually correspond to an address that is slightly lower than the first address requested by host processor 102 (except for the special case in which all of the truncated bits in the requested address were zeros). Thus, in such an embodiment, performance enhancements usually will be achieved for cases in which host processor 102 subsequently requests an address that is slightly lower than the first requested address.

Finally, note that the invention yields additional benefits relative to FIFO buffers in contexts where host processor 102 issues byte reads (as opposed to reads of, for example, an entire 32-bit data word). In the case of a 32-bit wide FIFO, a read of one byte would cause the entire 32-bit word in which the byte resided to be dumped. Each subsequent read to a neighboring byte would cause the FIFO to be flushed if the address of the subsequent byte corresponded to the same data word that was previously dumped. By contrast, a byte read to the cache/FIFO buffer system of the invention would not by itself cause the accessed 32-bit data word to be lost. Indeed, repeated accesses may often be made to the same 32-bit data word of the cache/FIFO buffer of the invention without losing the accessed word or reloading it from memory.

What is claimed is:

1. A method of responding to memory read requests in a computer system, the method comprising the steps of:

issuing speculative read requests to a memory, the speculative read requests specifying a range of consecutive memory addresses, each speculative read request for retrieving a data unit from the memory;

storing the data units retrieved by the speculative read requests in a buffer;

receiving an actual read request from a requesting device over a bus, the actual read request corresponding to a data unit of interest;

determining which of the following conditions is true: (1) the data unit of interest is currently stored in the buffer, (2) the data unit of interest is not currently stored in the buffer but has been requested from the memory, and (3) the data unit of interest has not been requested from the memory;

if it is determined that condition (1) is true, executing a hit routine that includes accessing the data unit of interest in the buffer and presenting the data unit of interest to the bus;

if it is determined that condition (2) is true, presenting a retry pattern on the bus; and if it is determined that condition (3) is true, executing a miss routine.

2. The method of claim 1, further comprising the step of:

receiving an initial read request from the requesting device over the bus, the initial read request specifying an initial memory address; and wherein the range of consecutive memory addresses includes the initial memory address.

3. The method of claim 1, wherein the range of consecutive memory addresses has a lowest address extreme and a highest address extreme;

wherein the storing step is performed by using a write pointer to write incoming data units into a segment of consecutive buffer locations in the buffer;

wherein the actual read request specifies an actual memory address; and wherein the determining step is performed by comparing at least a portion of the actual memory address with at least two values chosen from the following group: a value corresponding to the lowest address extreme; a value corresponding to the highest address extreme; and the value of the write pointer.

4. The method of claim 3, wherein the buffer is a circular buffer system having a beginning buffer location pointer for identifying a beginning buffer location of the segment and an end buffer location pointer for identifying an end buffer location of the segment; and wherein the hit routine further includes the steps of:

issuing a further speculative read request to the memory, the further speculative read request specifying a memory address that is consecutive with the memory address of the data unit stored in the end buffer location;

storing the data unit retrieved by the further speculative read request in a new buffer location that is consecutive with the end buffer location;

incrementing the end buffer location pointer to point to the new buffer location; and if the size of the segment at least equals a maximum size, maintaining the size of the segment by incrementing the beginning buffer location pointer.

5. The method of claim 4, wherein the storing step further includes storing each data unit retrieved in a buffer location having a select code that is equal to a portion of the bit field defining the memory address of the data unit;

wherein the method further includes the step of storing a portion of the bit field defining one of the address extremes in a base address register;

wherein the group of values recited in the determining step also includes the value of the base address register; and wherein the values recited in the determining step that correspond to the lowest and highest address extremes are taken from the beginning buffer location pointer and the end buffer location pointer.

6. The method of claim 1, wherein the actual read request specifies an actual memory address; and wherein the miss routine includes the steps of:

determining whether a predetermined maximum number of misses has occurred; and if so, repeating the step of issuing speculative read requests to the memory.

7. A method of responding to memory read requests in a computer system, the method comprising the steps of:

issuing speculative read requests to a memory, the speculative read requests specifying a range of consecutive memory addresses including first and second address extremes, each speculative read request for retrieving a data unit from the memory;

reserving a segment of consecutive buffer locations in a circular buffer system, the segment including a beginning buffer location and an end buffer location, each buffer location in the segment being randomly and directly accessible for reading;

as data units arrive responsive to the speculative read requests, using a write pointer to store them in the segment, starting at the beginning buffer location with the data unit retrieved from the first address extreme;

receiving an actual read request from a requesting device over a bus, the actual read request corresponding to a data unit of interest;

determining whether the data unit of interest is present in the segment; and if so, executing a hit routine that includes the steps of:

accessing the buffer location containing the data unit of interest; and presenting the data unit of interest to the bus.

8. The method of claim 7, where in the circular buffer system includes a beginning buffer location pointer and an end buffer location pointer, and wherein the hit routine further includes the steps of:

issuing a further speculative read request to the memory, the further speculative read request specifying a memory address that is consecutive with the second address extreme;

storing the data unit retrieved by the further speculative read request in a new buffer location that is consecutive with the end buffer location;

incrementing the end buffer location pointer; and if the size of the segment at least equals a maximum size, maintaining the size of the segment by incrementing the beginning buffer location pointer.

9. The method of claim 7, further comprising the step of:

receiving an initial read request from the requesting device over the bus, the initial read request specifying an initial memory address; and wherein the range of consecutive memory addresses includes the initial memory address.

10. The method of claim 7, wherein the determining step includes the steps of:

determining which of the following conditions is true: (1) the data unit of interest is currently stored in the buffer, (2) the data unit of interest is not currently stored in the buffer but has been requested from the memory, and (3) the data unit of interest has not been requested from the memory;

if it is determined that condition (1) is true, executing the hit routine;

if it is determined that condition (2) is true, presenting a retry pattern on the bus; and if it is determined that condition (3) is true, executing a miss routine.

11. The method of claim 10, wherein the actual read request specifies an actual memory address; and wherein the determining step is performed by comparing at least a portion of the actual memory address with at least two values chosen from the following group: a value corresponding to the first address extreme; a value corresponding to the second address extreme; and the value of the write pointer.

12. The method of claim 11,
wherein each data unit retrieved is stored in a buffer location having a select code that is equal to a portion of the bit field defining the memory address of the data unit;
wherein the method further includes the step of storing a portion of the bit field defining one of the address extremes in a base address register;
wherein the group of values recited in the determining step also includes the value of the base address register; and
wherein the values recited in the determining step that correspond to the first and second address extremes are taken from the beginning buffer location pointer and the end buffer location pointer.

13. The method of claim 10,
wherein the actual read request specifies an actual memory address; and
wherein the miss routine includes the steps of:
determining whether a predetermined maximum number of misses has occurred; and
if so, repeating the step of issuing speculative read requests to the memory.

14. Circuitry for responding to memory read requests in a computer system, the circuitry comprising:
read generation circuitry for issuing speculative read requests to a memory, the speculative read requests specifying a range of consecutive memory addresses including first and second address extremes, each speculative read request for retrieving a data unit from the memory;
a circular buffer system including a segment of consecutive buffer locations, the segment including a beginning buffer location and an end buffer location, each buffer location in the segment being randomly and directly accessible for reading;
write circuitry for storing data units, as they arrive responsive to the speculative read requests, in the segment starting at the beginning buffer location with the data unit retrieved from the first address extreme; and
control circuitry for receiving an actual read request from a requesting device over a bus and determining whether the data unit corresponding to the actual read request is present in the segment and, if so, executing a hit routine that includes accessing the buffer location containing the data unit of interest and presenting the data unit of interest to the bus.

15. The circuitry of claim 14,
wherein the circular buffer system includes a beginning buffer location pointer and an end buffer location pointer, and wherein the hit routine further includes the steps of:
causing the read generation circuitry to issue a further speculative read request to the memory, the further speculative read request specifying a memory address that is consecutive with the second address extreme;
storing the data unit retrieved by the further speculative read request in a new buffer location that is consecutive with the end buffer location;
incrementing the end buffer location pointer; and
if the size of the segment at least equals a maximum size, maintaining the size of the segment by incrementing the beginning buffer location pointer.

16. The circuitry of claim 14, wherein the range of consecutive memory addresses includes an initial address specified by an initial read request received from the requesting device over the bus.

17. The circuitry of claim 14, wherein the control circuitry is operable to determine which one of the following conditions is true: (1) the data unit of interest is currently stored in the buffer, (2) the data unit of interest is not currently stored in the buffer but has been requested from the memory, and (3) the data unit of interest has not been requested from the memory.

18. The circuitry of claim 17,
wherein the actual read request specifies an actual memory address; and
wherein the control circuitry performs its determination by comparing at least a portion of the actual memory address with at least two values chosen from the following group: a value corresponding to the first address extreme; a value corresponding to the second address extreme; and the value of the write pointer.

19. The circuitry of claim 18, further comprising a base address register; and
wherein each data unit retrieved is stored in a buffer location having a select code that is equal to a portion of the bit field defining the memory address of the data unit;
wherein a portion of the bit field defining one of the address extremes is stored in the base address register;
wherein the group further includes the value of the base address register; and
wherein the values corresponding to the first and second address extremes are taken from the beginning buffer location pointer and the end buffer location pointer.

* * * * *

UNITED STATES PATENT AND TRADEMARK OFFICE
CERTIFICATE OF CORRECTION

PATENT NO. : 6,253,288 B1
DATED : June 26, 2001
INVENTOR(S) : David L. McAllister et al.

It is certified that error appears in the above-identified patent and that said Letters Patent is hereby corrected as shown below:

Column 4,
Line 46, "Functionality" should be centered.

Column 12,
Line 27, delete "where in" and insert therefor -- wherein --

Column 13,
Line 47, delete "re quest" and insert therefor -- request --

Column 14,
Line 2, delete "beg inning" and insert therefor -- beginning --

Signed and Sealed this

Third Day of December, 2002

JAMES E. ROGAN
*Director of the United States Patent and Trademark Office*